United States Patent [19]
Mizuta

[11] Patent Number: 5,659,876
[45] Date of Patent: Aug. 19, 1997

[54] METHOD OF PRODUCING WASHER HAVING BOSS

[75] Inventor: Muneo Mizuta, Fuji, Japan

[73] Assignee: Jatco Corporation, Fuji, Japan

[21] Appl. No.: 545,112

[22] Filed: Oct. 19, 1995

[30] Foreign Application Priority Data

Nov. 10, 1994 [JP] Japan ................. 6-300112

[51] Int. Cl.⁶ .................. B22F 5/00; B22F 7/04
[52] U.S. Cl. ............... 419/8; 419/38; 419/46; 419/55; 419/59; 470/41; 470/42
[58] Field of Search ................. 419/8, 38, 46, 419/55, 59; 470/41, 42

[56] References Cited

U.S. PATENT DOCUMENTS

| | | | |
|---|---|---|---|
| 1,903,785 | 4/1933 | Lillig | 470/42 |
| 5,332,348 | 7/1994 | Lemelson | 411/427 |
| 5,390,414 | 2/1995 | Lisowsky | 29/893.34 |
| 5,456,406 | 10/1995 | Lemelson | 228/199 |
| 5,524,719 | 6/1996 | Dennis | 175/432 |

*Primary Examiner*—Charles T. Jordan
*Assistant Examiner*—Daniel Jenkins
*Attorney, Agent, or Firm*—Foley & Lardner

[57] ABSTRACT

A method for producing a washer having a boss comprises the following steps in the sequence set forth: (a) sprinkling powder of a bearing alloy onto a backing metal made of an iron-based alloy to form a composite material; (b) sintering the composite material to obtain a bimetal material so as to accomplish a primary sintering; (c) fabricating the bimetal material into a shape of the washer having the boss; and (d) simultaneously accomplishing a secondary sintering and carburizing of the washer having the boss. By virtue of simultaneously conducting the secondary sintering and the carburizing for the washer, the number of steps in producing method (particularly, during a heat treatment) is reduced thereby improving the productivity of the washer having the boss while reducing thermal energy required for the heat treatment.

6 Claims, 4 Drawing Sheets

METHOD OF PRODUCING WASHER HAVING BOSS

BACKGROUND OF THE INVENTION

1. Field of the Invention

This invention relates to improvements in a method of producing a washer having a boss, from a bimetal material which is a composite material including different metals, and more particularly to a heat treatment in such a method.

2. Description of the Prior Art

Hitherto it is known that a washer having a boss is formed of a composite material such as a bimetal material including a bearing alloy and an iron-based alloy. Such a bimetal material is conventionally produced by bonding different metals by hot cladding, cold cladding, sintering or the like. The bimetal material as a material for a washer having a boss is usually produced by sintering. Additionally, a heat treatment is conducted in the process for producing the bimetal material by the sintering and in a process for producing the washer having the boss from the bimetal material. Such heat treatment is conventionally conducted as follows:

First, powder of the bearing alloy is sprinkled on a backing metal and rolled to form a composite material. The composite material is subjected to a primary sintering (annealing) and then to a primary rolling. The composite material is thereafter subjected to a secondary sintering to form a bimetal material. A secondary rolling is conducted on the bimetal material so as to flatten the bimetal material. A blank of the shape of a washer is punched out from the bimetal material by using a press machine. The thus formed blank is formed into a washer having a boss through a burring step. Thereafter, the backing metal is carburized in a carburizing step thereby to strengthen the backing metal.

However, drawbacks have been encountered in the above discussed conventional production method of the washer having the boss, in which the washer having the boss is fabricated through the primary sintering and the secondary sintering, and additionally carburizing for the backing metal is thereafter carried out. Accordingly, the conventional production method of the washer having the boss has been unavoidably includes much steps and therefore is degraded in productivity and difficult in quality control, raising production cost of the washer having the boss.

BRIEF SUMMARY OF THE INVENTION

It is an object of the present invention is to provide an improved producing method of a washer having a boss, by which drawbacks encountered in conventional production methods for washers having a boss can be effectively overcome.

Another object of the present invention is to provide an improved producing method of a washer having a boss, in which the number of steps in production of the washer is reduced to improve the productivity of the washer while lowering cost required for production of the washer.

A further object of the present invention is to provide an improved producing method of a washer having a boss, in which a secondary sintering and a carburizing for the washer formed of a bimetal material are simultaneously conducted.

A method for producing a washer having a boss, according to the present invention comprises the following steps in the sequence set forth: (a) putting an alloy for a bearing on a backing metal made of an iron-based alloy to form a composite material; (b) sintering the composite material to obtain a bimetal material so as to accomplish a primary sintering; (c) fabricating the bimetal material into a shape of the washer having the boss; and (d) simultaneously accomplishing a secondary sintering and carburizing of the washer having the boss so as to completing sintering of the bearing alloy and carburize the backing metal.

With this producing method, by virtue of simultaneously conducting the secondary sintering and the carburizing for the washer, the number of steps in producing method (particularly, during a heat treatment) is reduced thereby improving the productivity of the washer having the boss while reducing thermal energy required for the heat treatment.

DETAILED DESCRIPTION OF THE INVENTION

Figure 1:
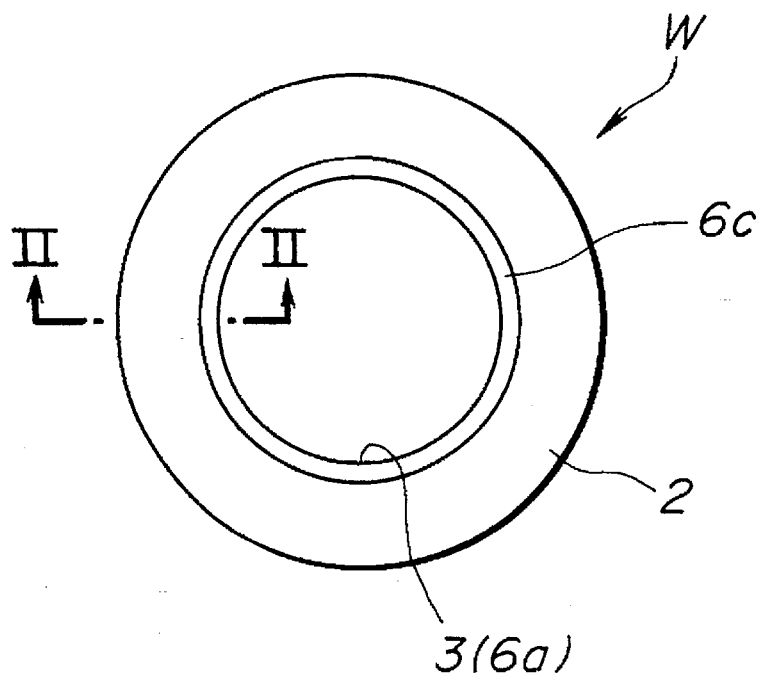
FIG. 1 is a plan view of a washer having a boss, produced in accordance with a producing method of the present invention.
Figure 2:
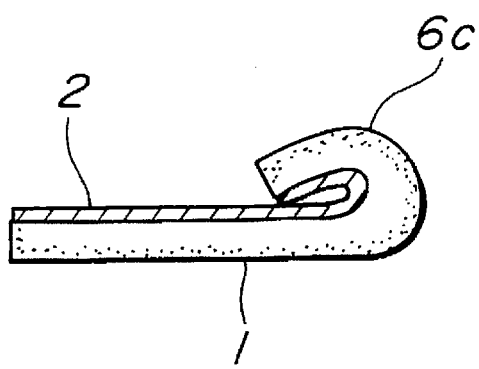
FIG. 2 is a sectional view taken in the direction of arrows substantially along the line II—II of FIG. 1.

Referring now to FIGS. 1 and 2, a washer having a boss, produced according to the present invention is illustrated by the reference character W. The washer W is generally annular to form a central circular hole 3 (6a). The washer W is formed of a bimetal material including a sheet-like backing metal 1 and a sheet-like alloy (referred hereinafter to as "bearing alloy") 2 to be used as a bearing. The bearing alloy 2 is fixedly bonded to the backing metal 1. The backing metal 1 is made of an iron-based alloy. As clearly shown in FIG. 2, the washer W is formed with a boss 6c which projects upwardly or in a direction far from a lower surface (forming part of the backing metal 1) of the washer W. The boss 6c is formed annular and along the inner periphery (defining the central hole 3) of the washer W.

An embodiment of a production process of the above washer W will be discussed with reference to FIGS. 3A to 3E and 4A to 5B.

Figure 3A:
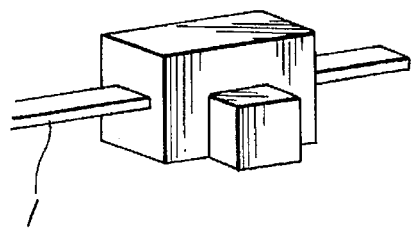
FIGS. 3A to 3E are explanatory perspective views illustrating an embodiment of the producing method of the washer, according to the present invention.
Figure 3B:
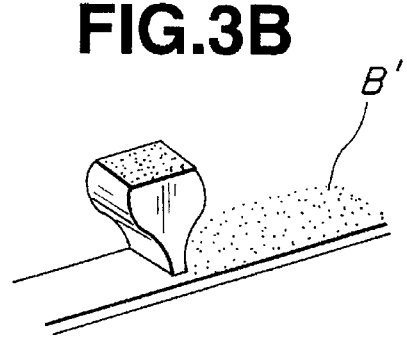

At a pretreatment step shown in FIG. 3A, the sheet-like backing metal 1 is subjected to a pretreatment including rinsing and degreasing. Thereafter, the pretreated backing metal 1 is transferred to a powder sprinkling step at which powder of the bearing alloy 2 is sprinkled on the surface of the backing metal 1 as shown in FIG. 3B. The bearing alloy 2 on the backing metal 1 is then compacted or pressed to take a sheet-like form for the purpose of facilitating sintering of a composite material B' including the backing metal and the bearing alloy, though not shown.

Figure 3C:
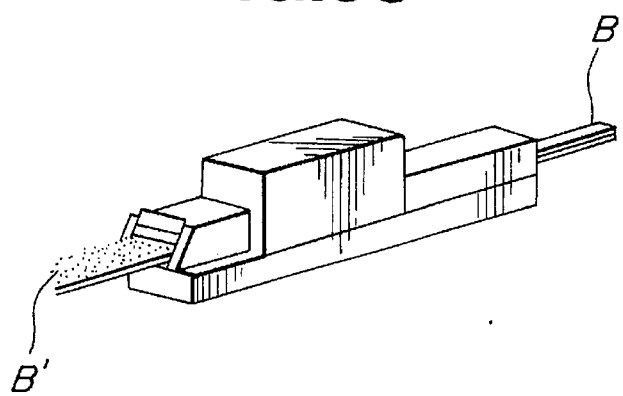
Figure 5A:
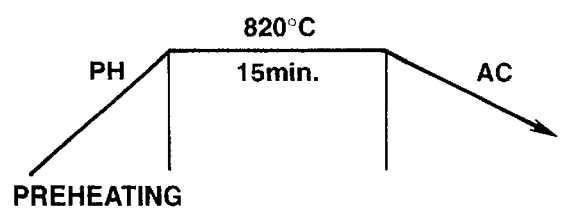
FIGS. 5A and 5B are graphs which respectively show manners of temperature controls for the primary sintering and the secondary sintering and carburizing in the embodiment of the production method of FIGS. 3A to 3E.

Then, the composite material B' is transferred to a primary sintering step in which the composite material is carried into a mesh belt-type continuous sintering furnace and heated at 820° C. for 15 minutes as shown in FIG. 3C, so that a bimetal material B including the backing metal 1 and the bearing alloy 2 is formed. A manner of temperature control for the primary sintering step is illustrated in FIG. 5A in which "PH" indicates preheating, and "AC" indicates air-cooling or cooling with air. The heating at 820° C. for 15 minutes is carried out in a condition in which a so-called RX gas atmosphere is regulated to have a dew point of 2° C. The RX gas contains 0.3 vol % of $CO_2$, 24.0 vol % of CO, 33.4 vol % of $H_2$, 0.4 vol % of $CH_4$, and balance of $N_2$.

Figure 3D:
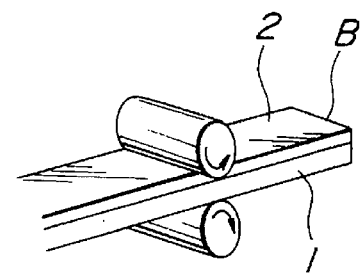

Thereafter, the bimetal material B is transferred to a primary rolling step as shown in FIG. 3D to be subjected to a rolling so that the backing metal 1 and the bearing alloy 2 take a predetermined thickness, thus producing the bimetal material B as a material for the washer W having the boss 6c.

Figure 4A:
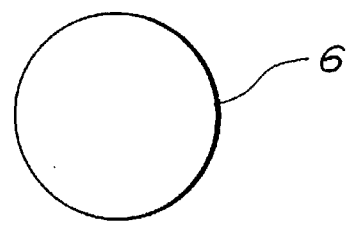
FIGS. 4A to 4F are explanatory views showing a machining process of the washer shown in FIGS. 1 and 2, forming part of the embodiment of the production method of FIGS. 3A to 3E.
Figure 4B:
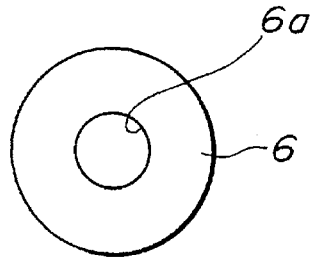
Figure 4C:
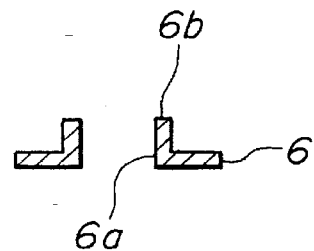
Figure 4D:
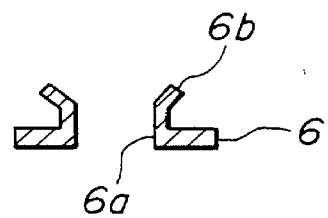
Figure 4E:
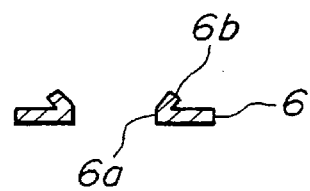
Figure 4F:
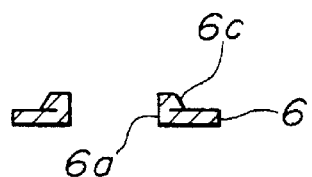

The thus produced bimetal material B is transferred to a machining process shown in FIGS. 4A to 4F to fabricate the washer or work. More specifically, the bimetal material B is punched out to form circular blanks 6 as shown in FIG. 4A, at a punching step. Each blank 6 is subjected to piercing to form a central opening 6a (corresponding to 3 in FIG. 1) as shown in FIG. 4B, at a piercing step. Then, the blank 6 formed with the opening 6a is subjected to a burring machining to form a cylindrical projection 6b which extends upwardly as shown in FIG. 4C. The cylindrical projection 6b is pressed outwardly as shown in FIG. 4D and then pressed inwardly as shown in FIG. 4E. Thereafter, the projection 6b is subjected to a restricting machining or pressing to form the boss 6c (in the shape shown in FIG. 2) shown in FIG. 4F. Finally, the boss 6c is subjected to an inner diameter and height sizing step to obtain predetermined inner diameter and height of the boss 6c. Thus, the fabrication of the work or washer W having the boss 6c is completed.

Next, the thus fabricated washer W having the boss 6c is transferred to a sintering and carburizing step in which a secondary sintering and carburizing (for the backing metal) of the washer W are simultaneously accomplished, after being subjected to a cleaning step to remove oil and impurities attached to the washer W during the above machining process.

Figure 3E:
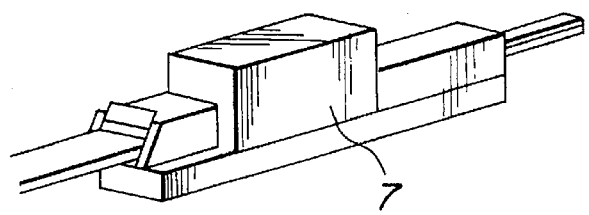

The second sintering and carburizing are accomplished by putting the washer W in a sintering furnace 7 as shown in FIG. 3E and by setting the temperature (heating temperature) within the furnace 7 at the level within a range between 800° and 900° C. At this temperature range, main components or elements (such as copper, silver, lead bronze and/or the like) of the bearing alloy 2 do not take their liquid phase to prevent a liquid phase sintering of the base elements from occurring; however, auxiliary components (such as lead, tin, phosphorus, nickel, zinc and/or the like) of the bearing alloy takes their liquid phase.

Figure 5B:
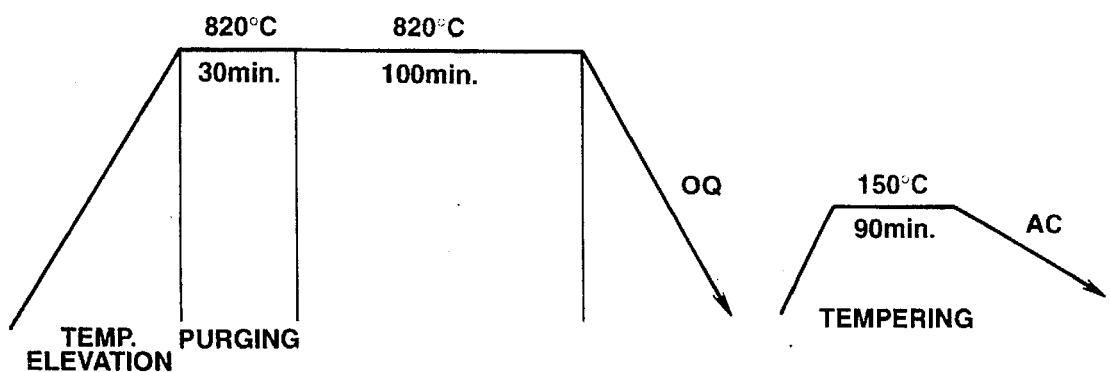

More specifically, the second sintering and carburizing are accomplished, for example, by purging an oxidizing atmosphere gas under introduction of a carburizer gas (for example, the RX gas) into the sintering furnace 7. As illustrated in FIG. 5B, the carburizer gas is introduced to contact with the washer W having the boss 6c under a condition to be heated at the above temperature range (for example, at 820° C.) for an oxidizing atmosphere gas purging time (for example, 30 minutes). This state is maintained for a retention time (for example, 100 minutes) to accomplish the second sintering and carburizing, in which a carbon potential is regulated at a value of 1.1%. It will be understood that the heating temperature may change depending upon time of sintering and kind of products (washers). The oxidizing atmosphere gas purging time may change depending upon kind of the sintering furnaces. The retention time may change depending upon a carburized case depth.

When the carburizing is completed, the washer W is subjected to hardening under oil cooling or quenching (indicated by "OQ" in FIG. 5B), and then again heated to a temperature ranging from 100° to 200° C. (for example, 150° C.). This heated condition is maintained, for example, for 90 minutes (for which the temperature of the washer W becomes uniform throughout the whole body from the surface to the inside), thus accomplishing the tempering of the washer W, as shown in FIG. 5B.

After completion of the tempering, the washer W is rinsed to remove impurities and oil attached during the carburizing. Then, the washer W is subjected to a final inspection to be forwarded as a final product (washer W having the boss 6c).

While the manners of temperature controls for the primary sintering, secondary sintering and carburizing have been shown in FIGS. 5A and 5B, respectively, it will be understood that the manners may not be limited to those shown in the figures and described in the specification. Additionally, although experimental or trial data for the producing method of the washer have been shown and described as examples, it will be appreciated that such data may not be limited to those indicated in figures and the specification and therefore may be altered according to a carburized case depth, a size of the product or washer, a circumstance in which the product is to be used, and/or a composition of the material of the product.

As appreciated from the above, according to the producing method of the present invention in which the second sintering and the carburizing are simultaneously conducted, the number of steps in the producing method can be reduced as compared with a conventional producing method in which a washer having a boss is produced from a bimetal material upon a secondary sintering and thereafter is subjected to a carburizing. This effectively achieves improvements in productivity and readiness in quality control for the washer having the boss, while achieving lowering in production cost of the washer having the boss. Additionally, the simultaneous conduct of the second sintering and the carburizing effectively reduces thermal energy required for the heat treatment as compared with the conventional producing method in which the secondary sintering and the carburizing are separately conducted, thereby largely reducing electric power and fuel consumption required for the heat treatment.

What is claimed is:

1. A method for producing a washer having a boss, comprising the following steps in the sequence set forth:
    putting an alloy for a bearing on a backing metal made of an iron-based alloy to form a composite material;
    sintering the composite material to obtain a bimetal material so as to accomplish a primary sintering;
    fabricating said bimetal material into a shape of the washer having the boss; and
    simultaneously accomplishing a secondary sintering and carburizing of the washer having the boss.

2. A method as claimed in claim 1, wherein the bearing alloy putting step includes pressing said bearing alloy on said backing metal.

3. A method as claimed in claim 1, wherein said second sintering and carburizing step including heating the washer at a temperature within a range at which a main component of said bearing alloy is prevented from becoming into a liquid phase, and an auxiliary component becomes into a liquid phase.

4. A method as claimed in claim 1, wherein said second sintering and carburizing step includes heating the washer at a temperature ranging from 800° to 900° C.

5. A method as claimed in claim 1, wherein said bearing alloy contains as a main component at least one selected from the group consisting of copper, silver and lead bronze.

6. A method as claimed in claim 5, wherein said bearing alloy contains as an auxiliary component at least one selected from the group consisting of lead, tin, phosphorus, nickel and zinc.

* * * * *